April 21, 1953　　　　　　　　E. R. TAYLOR　　　　　　　2,636,116
MICROWAVE CIRCUIT STABILIZATION MEANS
Filed June 23, 1950　　　　　　　　　　　　　　　　5 Sheets-Sheet 1

INVENTOR
E. R. TAYLOR
BY H. A. Burgess
ATTORNEY

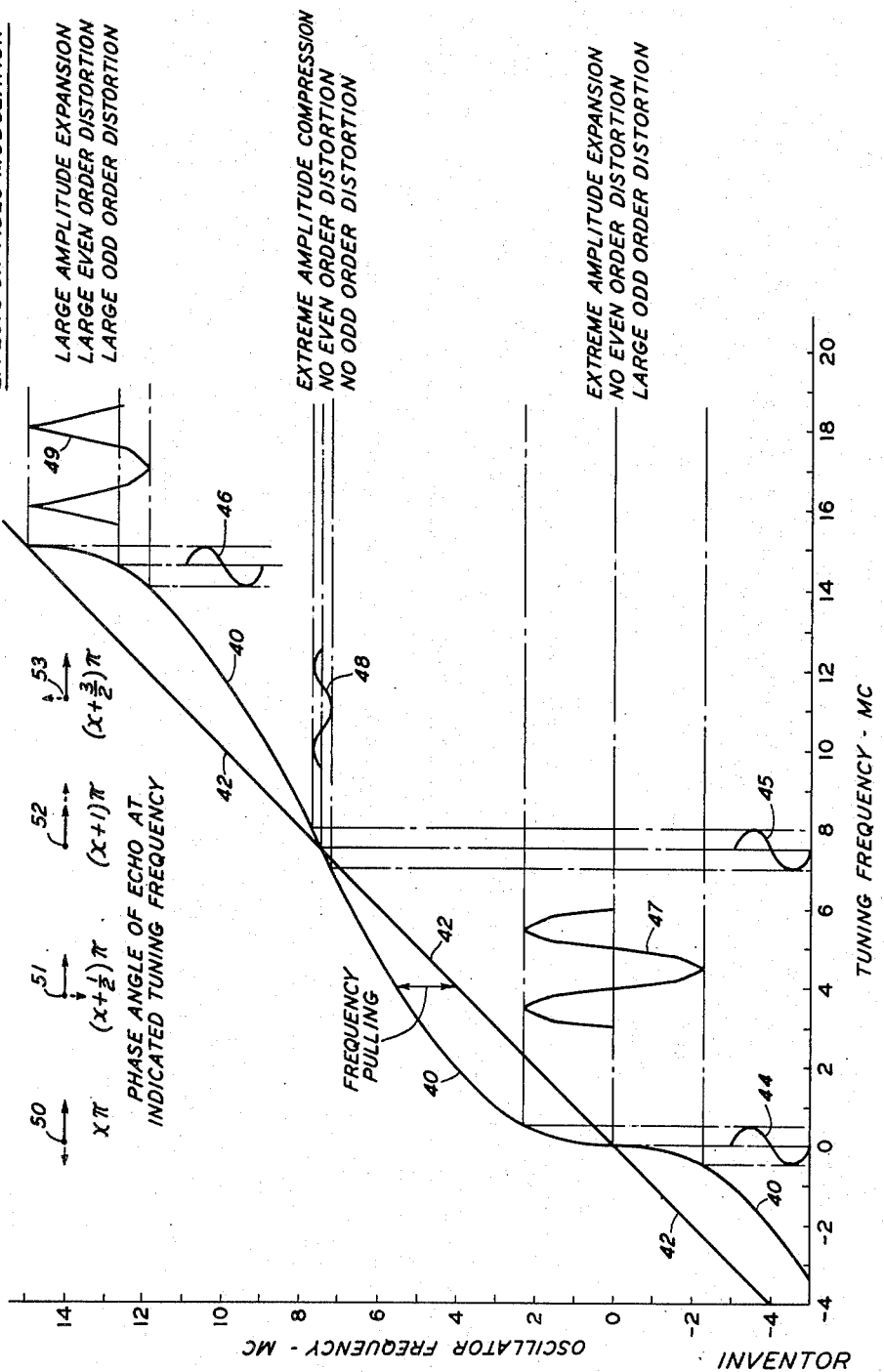

April 21, 1953  E. R. TAYLOR  2,636,116
MICROWAVE CIRCUIT STABILIZATION MEANS
Filed June 23, 1950
5 Sheets-Sheet 3

INVENTOR
E. R. TAYLOR
BY H. A. Burgess
ATTORNEY

April 21, 1953        E. R. TAYLOR        2,636,116
MICROWAVE CIRCUIT STABILIZATION MEANS
Filed June 23, 1950        5 Sheets-Sheet 4

INVENTOR
E. R. TAYLOR
BY
H. A. Burgess
ATTORNEY

April 21, 1953 E. R. TAYLOR 2,636,116
MICROWAVE CIRCUIT STABILIZATION MEANS
Filed June 23, 1950 5 Sheets-Sheet 5
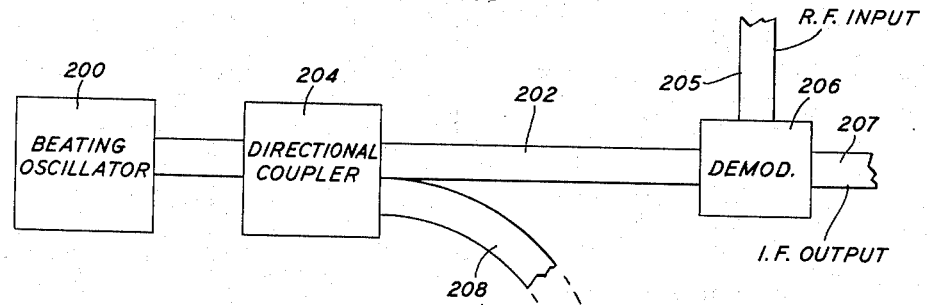
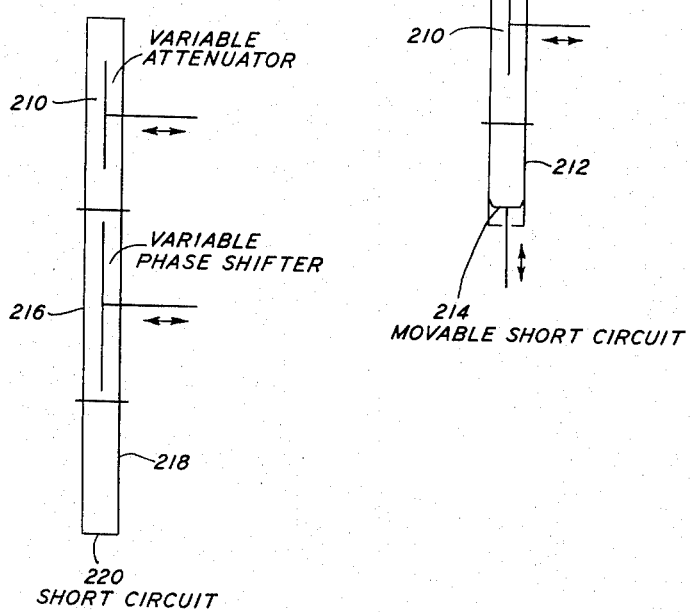
INVENTOR
E. R. TAYLOR
BY
H. A. Burgess
ATTORNEY Patented Apr. 21, 1953

2,636,116

UNITED STATES PATENT OFFICE 2,636,116

MICROWAVE CIRCUIT STABILIZATION MEANS

Edmund R. Taylor, Pelham, N. Y., assignor to Bell Telephone Laboratories, Incorporated, New York, N. Y., a corporation of New York Application June 23, 1950, Serial No. 169,863

5 Claims. (Cl. 250—17)

This invention relates to circuit arrangements which reduce and linearize "frequency pulling" resulting from "long line effects" in transmission circuits in which a load-sensitive oscillator supplies power to a load over a transmission line which is long with respect to the wavelengths of the energy supplied by the oscillator. More particularly it relates to the provision of means, in systems of the character described above, for "masking" undesired reflections from the load end of the transmission line so that objectionable effects of said reflections on the oscillator are reduced and/or linearized.

A principal object of the invention is therefore to reduce and linearize the objectionable effects of load end reflections upon a load-sensitive oscillator which is connected to a load by a relatively long transmission line.

Other objects are to produce systems of the above-described character in which frequency modulated signals can be transmitted from the oscillator to the load with decreased modulation distortion, controllable modulation sensitivity and reduced noise.

Additional objects will become apparent during the course of the following discussion and description of specific illustrative embodiments of the invention as well as from the appended claims.

Discussion of problems

Signaling systems involving an oscillator connected to a load impedance by a transmission line several wavelengths long, for example ten or more wavelengths long, are subject to undesirable transmission performance when the load impedance differs from the oscillator impedance.

For systems operating over relatively wide or extended frequency ranges or regions, the impedances of the available types of oscillators and load devices can usually be made to match each other only over relatively small portions of the wide frequency ranges or regions. The width of a frequency range or region is usually expressed by those skilled in the art as the ratio of the difference between the lowest and highest frequencies of the range divided by the mid-frequency or median frequency of the range. The width of a frequency range is, in accordance with this convention, expressed in per cent of the median frequency. For the purposes of this application, ranges of .2 per cent or more of the median frequency are considered relatively wide.

The undesirable oscillator performance can take various forms such as frequency instability, power fluctuations, wave form distortion and the like. Although these effects can occur and are objectionable with any system of modulation, they are particularly objectionable and injurious in systems in which the oscillator is frequency modulated, since in such systems severe distortion of the signal itself is very likely to be a result of such effects.

Expedients used in the past to mitigate these effects, fall into two general classes: (1) improvement in load impedance so that it more nearly matches the oscillator impedance over the desired operating frequency range, and (2) attenuation of reflections (or echoes) due to the impedance mismatch at the load end of the transmission line. The first-mentioned expedient is often of limited usefulness because the load is usually a microwave antenna, or some similar device, the impedance of which varies in an unpredictable and random manner under such variable influences as moisture, temperature changes, icing conditions and the like. The second-mentioned expedient is extravagant of output power because the attenuator, or the effectively decreased coupling, used to attenuate the echo, also attenuates the useful power. Some schemes, such as that shown in United States Patent 2,485,030, issued October 18, 1949, to W. E. Bradley, for example, attempt to combine these expedients, i. e., impedance matching over a limited frequency band and attenuation at other frequencies. However, such combinations of these expedients still frequently fall far short of affording the desired performance.

The present invention involves the use of novel arrangements which are based on a positive control of the oscillator sensitivity to the objectionable effects of the types described above. In a limited sense, it is analogous to the use of grid bias to control vacuum tube performance. In one specific form of the invention a non-dissipative reactance is connected across the transmission line adjacent to the oscillator output terminals in such a manner that the oscillator is "biased" to produce the desired effects. As discussed in detail hereinunder, improvements, in addition to freedom from difficulties resulting from undesirable load impedances, are obtained. These include, in frequency modulated systems, decreased modulation distortion, controlled modulation sensitivity, and reduced noise.

The principles of the invention will be more readily perceived in connection with the following detailed description of specific illustrative embodiments shown in the accompanying drawings, in which:

Fig. 2 illustrates, by a group of related curves, the actual frequency responses for several operating conditions of a system such as that illustrated in Fig. 1;

Fig. 10 shows in block schematic diagram form a second specific form of circuit in which the principles of the invention are embodied; and Fig. 11 shows an alternative arrangement of apparatus for use in the circuit of Fig. 10.

The following detailed explanation of the performance of an oscillator operating into a frequency sensitive load, as applied to a conventional circuit, will be an aid to the understanding of the principles of the present invention.

Figure 1:
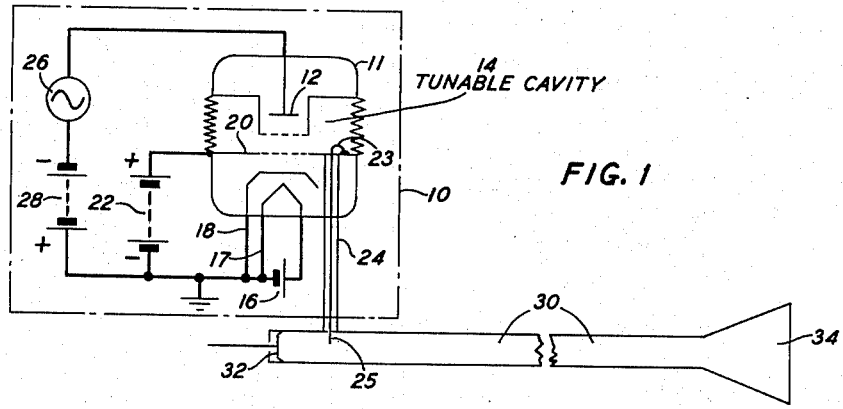
Fig. 1 shows, in schematic diagram form, a typical specific system of the prior art in connection with which the difficulties, which can be minimized by the application of the principles of the invention, can be described.

Fig. 1 illustrates, in schematic diagram form, a typical prior art system. The system of Fig. 1 is of conventional form and is commonly designated a high frequency radio transmitter. It consists of conventional components, which are a reflex oscillator circuit 10, the vacuum tube 11, of which circuit, can be of the type, for example, discussed by Pierce and Shepherd in the Bell System Technical Journal, vol. XXVI, No. 3, July 1947, page 460, coupled by coaxial output lead 24 to a wave guide 30 which terminates in an antenna 34. Oscillator tube 11 comprises a repeller anode 12, a tunable "bellows type" cavity 14, a control electrode 20, a cathode 18, a cathode heating element 17, and a coaxial output lead 24 coupled to cavity 14 by loop 23 and to wave guide 30 by probe 25, which latter can be an extension of the inner conductor of coaxial lead 24. The oscillator tube 11 is frequency modulated by the alternator 26, shown connected in the circuit of the repeller electrode 12. Heating energy battery 16 and bias voltage batteries 22 and 28 perform their conventional functions in the circuit.

The performance of a typical system of the type shown in Fig. 1, when a part of the output energy is reflected back by an impedance mismatch at the antenna end of the line, into the oscillator, may be described with reference to the curves of Fig. 2 as follows:

The curve 40 of Fig. 2 indicates the frequencies obtained as the oscillator 10 is tuned while connected, by wave guide 30, to the antenna 34 as a load. The reference or "zero" frequency for both the tuning "ordinates" and oscillator "abscissa" frequency scales is chosen at a frequency such that the phase shift of the reflected energy or the echo path, as seen from the oscillator, is an odd multiple of $\pi$ radians. The phase angle of the echo relative to the oscillator output for four tuning frequencies is indicated by the vectors designated 50, 51, 52, and 53, respectively, on the upper part of Fig. 2. With respect to Fig. 2, the vector relations 50 to 53, inclusive, represent the phase angles of the echo with respect to the oscillator output at the tuning frequencies "0," "3.75," "7.5," "11.25" megacycles, respectively. The solid arrow in each instance represents the phase of the output wave and the dashed arrow the phase of the echo. $X$ represents an odd number. The phase angle for each vector relation is indicated under the vectors 50 to 53, inclusive, in Fig. 2.

The distance between the oscillator and the load is for this illustrative example, such that the phase shift in the echo path changes $2\pi$ radians for each change of 15 megacycles in tuning. The factors determining this "phase cycle" will be discussed in detail hereinafter. Accordingly, the curve 40 of Fig. 2 and the oscillator abnormalities, of which it is symptomatic, repeat at 15-megacycle intervals, as the tuning frequency is changed over greater ranges than that indicated in Fig. 2. If the oscillator had been operating into its characteristic impedance at all tuning frequencies, there would have been no echo and the tuning versus frequency curve would then have been a straight-line 45-degree diagonal, as shown by line 42 of Fig. 2.

The vertical distance between curve 40 and line 42 indicates the amount of "frequency pulling" at each particular tuning frequency. It should be noted that the frequency pulling is zero when the echo phase angle is an odd multiple of $\pi$ radians $(X\pi)$ but that it increases rapidly as the tuning frequency is changed from such a point, and the echo phase angle, of course, departs from $X\pi$ radians. As the tuning frequency is increased further, the amount of pulling soon reaches a maximum and then slowly decreases to zero again when the echo phase reaches an even multiple of $\pi$ radians $[(X+1)\pi]$. As the tuning frequency is still further increased and the echo phase angle progresses further to an odd multiple of $\pi$ radians, the pulling reverses in sign, slowly increasing in magnitude to a maximum and then rapidly decreasing to zero again at $(X+2)\pi$, etc., ad infinitum.

Fig. 2 also illustrates by curves 47, 48, and 49 the oscillator performance during frequency modulation when the average echo phase shift is $X\pi$ radians, $(X+1)\pi$ radians, and slightly less than $(X+2)\pi$ radians, respectively, i. e., when the average tuning frequency is 0, 7.5 and 14.5 megacycles. Identical sine waves indicated by curves 44, 45, and 46 are shown centered on vertical axes at these frequencies. They represent oscillator tuning curves such as those caused by a sine wave video drive. If the oscillator were working into its characteristic impedance, a pure sine wave input would produce identical output sine waves at all tuning frequencies instead of the heterogeneous waves represented, for example, by the curves 47, 48, and 49, respectively, along horizontal axes representing the same median oscillator frequencies as for the three input waves 44, 45, and 46, respectively. The actual output frequencies produced during these three illustrative frequency modulations are therefore those indicated by the curves 47, 48, and 49, respectively. They are obviously very different from the input sine waves 44, 45, and 46, respectively. Before examining the output waves 47 to 49, inclusive, in detail, it will be helpful to remember that in frequency modulation systems, oscillator frequency variations are normally indicative of video output amplitude changes. Therefore, sine wave curves 44, 45, and 46, respectively, may be taken as representing input video waves, and curves 47, 48, and 49, respectively, may be taken as representing the corresponding output video waves.

Comparison of curves 44 and 47 shows that the action of the oscillator when the average input is at "zero" megacycles (echo in phase opposition with the oscillator output) causes large expansion of the video signal with large odd order distortion but no even order distortion (curve 40 is symmetrical about the "zero" megacycle or median frequency point). Curves 45 and 48 indicate that the video signal is compressed when the average input is 7.5 megacycles (echo in phase addition). Curve 48 is again symmetrical and is substantially rectilinear over the modulating frequency range so that there is substantially no distortion. Curves 46 and 49 indicate conditions when the average input is at 14.5 megacycles, i. e., the echo reaches exact phase opposition only at the peak of the frequency modulation swing. Violent distortion of both odd and even orders is apparent.

This brief consideration of a particular oscillator performance, as given above, indicates that where, as in the system illustrated by Fig. 1, the oscillator is connected by a transmission line several wavelengths or more in length to its load impedance (antenna 34 of Fig. 1, for example), a mismatch between the oscillator impedance and the load impedance can cause large abnormalities and severe distortion in oscillator output performance. It has been found that the degree and type of abnormality are principally determined by the following:

(a) The amount of mismatch between oscillator and load impedances. This is commonly indicated as the VSWR (voltage standing wave ratio). The voltage standing wave ratio is the ratio between the maximum and minimum voltages occurring in the transmission line near the mismatched load. See, for example, "Principles of Radar" (M. I. T. Press), 1946, Chapter 8, page 41, published by McGraw-Hill. The maximum is due to the reflected wave adding to the oscillator output wave and the minimum is due to the former subtracting from the latter. VSWR is commonly expressed either as a numeric=

$$\frac{E_{max.}}{E_{min.}}$$

or in db, i. e., $$20 \log \frac{E_{max.}}{E_{min.}}$$

(b) The distance along the connecting transmission line from the oscillator to the mismatch in impedance in terms of the phase shift between the normal oscillator output and the echo resulting from the impedance mismatch.

(c) The sensitivity of the particular oscillator to echo currents. In radar and microwave systems, this sensitivity is expressed by a term known as the "pulling figures," which may be defined as the total frequency variation in megacycles of the oscillator frequency which occurs when a load causing a VSWR of 1.5 is varied in phase over a full cycle of phase variation, i. e., a cycle such as that covered by curve 40 of Fig. 2, between 0 and +15 megacycles, as described above.

If the curves of the oscillator and line susceptances be drawn to obtain tuning versus frequency curves similar to curve 40 of Fig. 2 for various mismatches, distances, or lengths of transmission line between the oscillator and the mismatch, etc., it will be found that the frequency becomes indeterminate (more than one oscillator frequency corresponds to a single tuning frequency) when the slope of the oscillator susceptance equals the negative of the slope of the line susceptance. This establishes the familiar "just jumping" point in the operation of radar and microwave systems. See, for example, the article entitled "Reflex oscillators," by Pierce and Shepherd, in the Bell System Technical Journal for July 1947, volume 26, No. 3, concluding paragraph on page 525 and pages 526 and 527. It will also be noted that at this "jumping point," the frequency versus tuning curve is vertical so that the video gain expansion would, theoretically, be infinite. The conditions which obtain at the "just jumping" point are of interest, not only because they indicate the limit of smooth tuning, but also, as noted, they determine the point where video gain expansion becomes infinite. This will define an important point on curves that may be drawn to relate video gain expansion to another parameter, such as "pulling figure" or distance to the mismatch.

Conditions at "just jumping" may be derived as follows:

Let $F$=the "pulling figure" of the oscillator in megacycles.

$Fj$=the "pulling figure" of an oscillator that "just jumps" when operating into a particular load at a particular distance.

$n$=the number of wavelengths (or cycles) of phase shift between the oscillator and the load.

$\Delta n$=the deviation of $n$ from an integer.

$L$=the distance along the transmission line from the oscillator to the load in feet.

$Lj$=the distance along the transmission line from a particular oscillator to a particular load that just causes "frequency jumping."

$c$=the speed of light in air in ft./sec.

$K$=wavelength in air divided by the wavelength in the transmission line or wave guide for the particular circuit and frequency of interest.

$\sigma$=the voltage standing wave ratio.
$B$=line susceptance.
$-b$=oscillator susceptance.
$\Delta f_m$=maximum "frequency pulling."

The oscillator susceptance $$b = \frac{-\Delta f \cdot 10^{-6}}{1.2F} = -\frac{cK\Delta n \cdot 10^{-6}}{1.2FL} \qquad (1)$$

The slope of $$b = -\frac{cK \cdot 10^{-6}}{1.2FL} \qquad (2)$$

$$B = \frac{\sin 4\pi\Delta n}{\frac{\sigma^2+1}{\sigma^2-1} + \cos 4\pi\Delta n} \qquad (3)$$

and the maximum slope of $B$ ($\Delta n = .25$)

$$= -2\pi(\sigma^2 - 1). \qquad (4)$$

The "just jumping" point occurs when these slopes are equal, i. e., $$2\pi(\sigma^2 - 1) = \frac{cK \cdot 10^{-6}}{1.2FL} \text{ or } Fj = \frac{130.5K}{L(\sigma^2-1)} \qquad (5)$$

Therefore, if $F$, $K$, $L$, and $\sigma$ are known for a particular system, it may be compared with the conditions that would just cause "frequency jumping."

Figure 3:
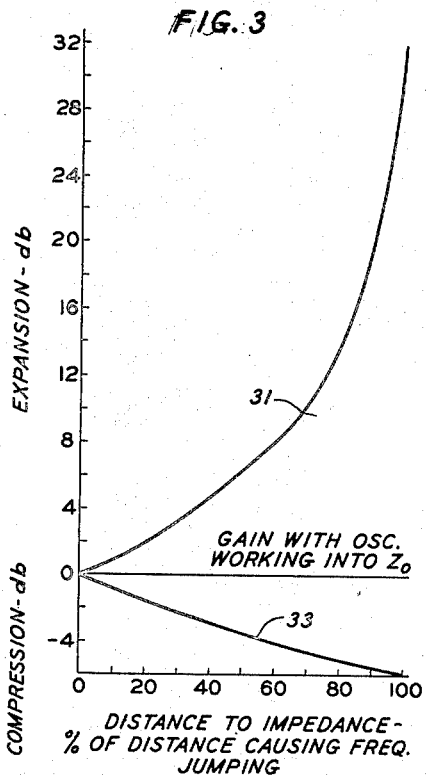
Fig. 3 illustrates, in curve form, the relation between video gain compression or expansion and the length of the transmission line connecting the oscillator with the load, in a system of the general type illustrated by Fig. 1.

The foregoing discussion suggests semi-universal curves relating video gain expansion or compression to distance between the oscillator and the mismatch, the distance to be expressed in per cent of the distance required for "just jumping." The curves 31 and 33, respectively, of Fig. 3 are of this character. The video modulation for Fig. 3 is assumed to be very small so that the maxima are not obscured by rapid changes in line susceptance, as was the case in Fig. 2. The curves 31 and 33 of Fig. 3 are useful in determining the maximum video expansion or compression, respectively, that would be encountered as the phase of an echo caused by a given mismatch is rotated through a complete cycle. For example, if the oscillator "pulling figure" is 15 megacycles, the wave guide K is .616, the wave guide distance to the antenna is 3 feet, and the VSWR of it is 1.5, the range of possible values may be determined as follows:

$$FL \text{ for "just jumping"} = \frac{80.38}{2.25-1} = 64.3 \qquad (6)$$

$FL$ for the assumed example=$3 \times 15$ which is 70 per cent of 64.3. Using the 70 per cent line on Fig. 3, we see that the video expansion may be as much as 10.4 decibels and the compression may be as much as 4.6 decibels. In other words, if such an oscillator is to produce constant frequency modulation deviation at any phase of such a load, the video input over-load limit must be raised 4.6 decibels and the gain control range must be extended 15 decibels over what would have been required if the antenna impedance had matched that of the oscillator.

It may be noted in connection with Fig. 3 that the maximum compression in decibels is $$20 \log\left(1 + \frac{L}{L_j}\right) \text{ or } 20 \log\left(1 + \frac{F}{F_j}\right) \qquad (7)$$

and maximum expansion in decibels is $$20 \log\left(\frac{1}{1 - \frac{L}{L_j}}\right) \text{ or } 20 \log\left(\frac{1}{1 - \frac{F}{F_j}}\right) \qquad (8)$$

Accordingly, it is apparent that a reduction of the effective F, such as is afforded by this invention, will result in reduction in compression and expansion.

Figure 4:
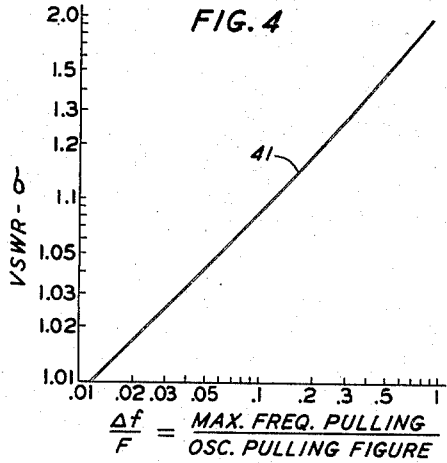
Fig. 4 illustrates, in curve form, the relation between maximum "frequency pulling" and the voltage standing wave ratio (VSWR), for a system of the general type illustrated in Fig. 1.

The chart of Fig. 4 shows, along line 41, maximum "frequency pulling" versus VSWR. The curve 41 is based on the following formula:

Maximum frequency pulling $$\Delta f_m = \pm .6F\left(\frac{\sigma^2-1}{\sigma}\right) \qquad (9)$$

which is obtained as follows:

Maximum line susceptance $$B_{max.} = \pm\frac{\sigma^2-1}{2\sigma}$$

Oscillator frequency shift, for small changes of its susceptance, closely approximates $$\Delta f = -1.2F\Delta b$$

Equating $B_{max}$ to $\Delta b$, $$\Delta f = \pm 1.2F\left(\frac{\sigma^2-1}{2\sigma}\right) \qquad (10)$$

$\therefore$ Maximum frequency pulling approximates $$\pm .6f\left(\frac{\sigma^2-1}{\sigma}\right) \qquad (11)$$

Here again, a reduction in the magnitude of the effective "pulling figure" F is highly desirable.

An example of the use of the chart of Fig. 4 is as follows: Assume an oscillator "pulling figure" of 10 megacycles and a load VSWR of 1.6. How much may the oscillator frequency shift as the load is shifted to characteristic impedance or vice versa. From Fig. 4, we see that when the VSWR=1.6, the ratio of maximum "frequency pulling" in megacycles to oscillator "pulling figure" is .58. Therefore, the maximum possible change would be ±5.8 megacycles. Distance to the mismatch does not enter into the formula for maximum "frequency pulling." Its effect on "frequency pulling" is only to determine the periodicity of the cycle of "pulling" versus tuning frequency, as, for example, the distance assumed for Fig. 2 resulted in a periodicity of 15 megacycles.

Figure 5:
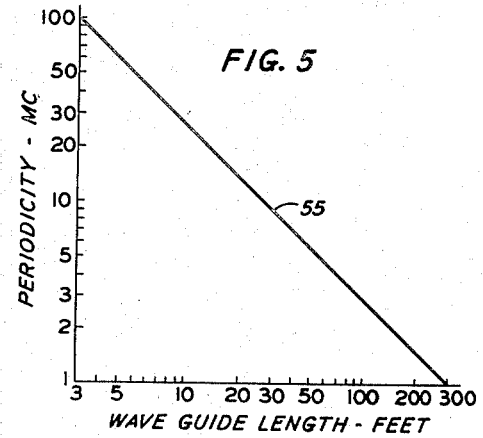
Fig. 5 illustrates, in curve form, the relation between periodicity in megacycles versus transmission line (wave guide) length in feet for a system of the general type illustrated in Fig. 1 and is used in explaining certain principles of the invention.

The chart of Fig. 5 shows along line 55 periodicity in megacycles versus wave guide length in feet. (This chart is computed for four kilomegacycles and $K$=.616. For other frequencies, P (see Equation 12 below) or L should be divided by the ratio of the new K to .616 before using the chart.) It is useful in determining the frequency change which would cause a complete rotation of the echo phase or, conversely, the distance to a mismatch. It is derived from the following formula:

Perodicity in megacycles $$P = .5\frac{ck}{L\times10^6} = \frac{303}{L} \text{ for 4 kmc.} \qquad (12)$$

Thus far, the main consideration has been for the video gain or frequency pulling extremes. The video gain extremes occur when the echo is in phase addition or phase opposition to the oscillator output. As shown by Fig. 2, for example, maximum "expansion" occurs at "0" and 15 megacycles (phase-opposition) and maximum "compression" occurs at 7.5 megacycles (phase-addition). Gain or "frequency pulling" gyrations between these extremes are difficult to predict without resorting to graphical methods. The curves 60, 62 of Fig. 6 indicate the type of video gain performance to be expected. They show cavity tuning change versus abnormal video drive required to produce a constant frequency modulation deviation for two oscillator load conditions.

In one case, curve 62, the standing wave ratio is .4 decibel, in the other, curve 60, it is 1 decibel. With this exception, the conditions are identical. When the conditions are far from causing the oscillator to jump (37 per cent for the .4 decibel curve 62), the curve is similar to a small low cycloid, with cusps and crests about equally spaced above and below the normal drive. However, as the conditions approach "jumping values" (97 per cent for the 1 decibel curve 60), the crests become somewhat higher, and the cusps become very much lower.

Two types of abscissa are shown, tuning change in megacycles and wave guide phase shift in degrees. This is allowable in this case, as only a single mismatch is assumed. If more than one mismatch existed, separate curves would be required.

Figure 6:
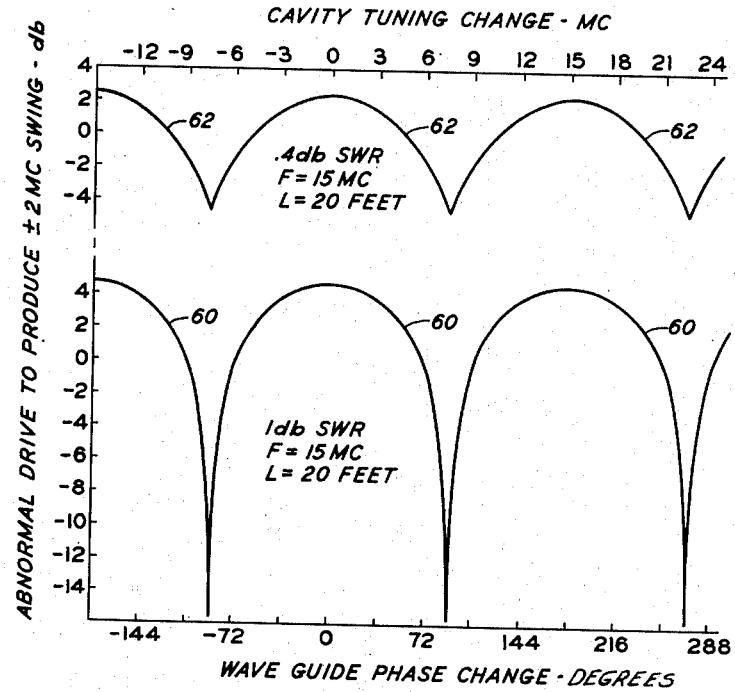
Fig. 6 illustrates, in curve form, the type of video gain performance to be expected of a system of the general type illustrated in Fig. 1.
Figure 7:
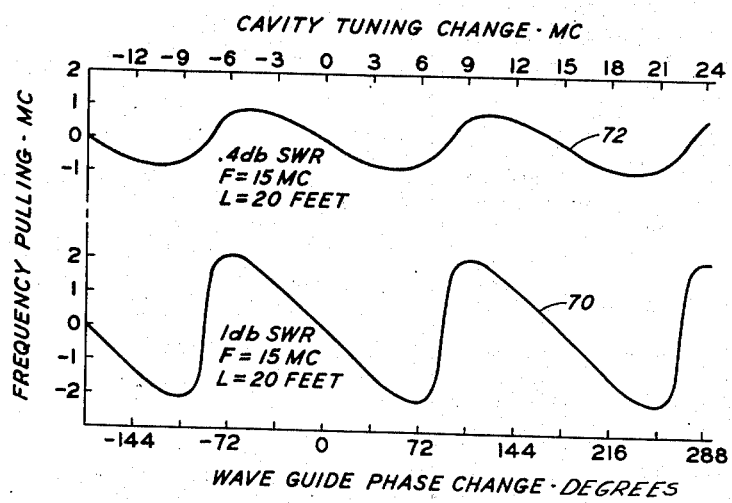
Fig. 7 illustrates, in curve form, the "frequency pulling" characteristics of a system of the general type illustrated in Fig. 1 for the same mismatch conditions as were assumed in connection with Fig. 6.

Curves 70 and 72 of Fig. 7 show the frequency pulling gyrations for the same mismatch conditions that were assumed for the curves 60 and 62, respectively, of Fig. 6. Note that the curves depart more and more from a sine wave as jumping conditions are approached, finally becoming almost a saw-tooth curve.

Detailed consideration of Fig. 2 and Fig. 6 shows that the echo caused by the antenna mismatch results in two types of oscillator behavior occurring alternately as the oscillator is continuously tuned. The first type, such as occurs between −3 and +3 megacycles, +12 and +18 megacycles, etc., in Fig. 6, results in compression, i. e., changes in oscillator frequencies are impeded. The second type, which occurs around −7.5, +7.5, and +22.5 megacycles, etc., in Fig. 6, results in expansion, i. e., changes in oscillator frequency are facilitated.

These phenomena form the basis for the present invention. When an echo is phased to decrease modulation sensitivity (such as ±35 degrees in Fig. 6), the effective "pulling figure" of the oscillator is reduced, and the effect of other echoes is correspondingly reduced. Accordingly, variation in system video gain will be reduced, video wave distortion will be reduced, "frequency pulling" will be reduced, etc., video noise due to imperfectly filtered oscillator power supplies or fortuitous changes in oscillator constants which tend to cause undesired frequency changes will also be reduced because we have made the oscillator harder to modulate and have increased the desired modulation drive accordingly.

Of course, if the echo is phased to increase modulation sensitivity (such as 90±10 degrees in Fig. 6), the desired modulation drive could be reduced, but the other effects mentioned above would be increased rather than diminished.

*A specific embodiment of the present invention*

Figure 8A:
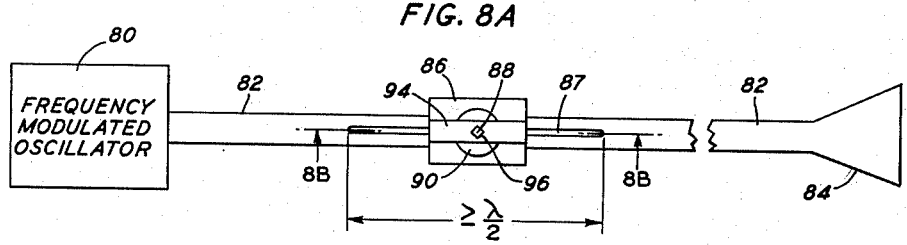
Figs. 8A and 8B illustrate one specific form of circuit of the general type illustrated by Fig. 1, in which a specific arrangement in accordance with the principles of the invention has been embodied.
Figure 8B:
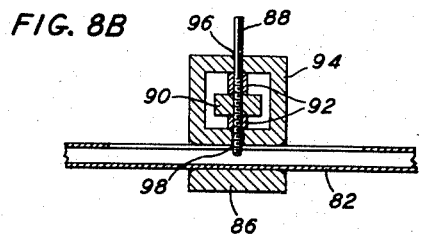

One specific embodiment of the present invention is illustrated by Figs. 8A and 8B.

The general type of system illustrated in Fig. 8A is very similar to that illustrated in Fig. 1 and described in detail above. The system of Fig. 8A comprises a frequency modulated oscillator 80 connected by a wave guide 82 to an antenna 84. In a typical radar or microwave system, the length of wave guide 82 is likely to be, for example, in the order of 10 to 30 feet in length.

At a point on the wave guide 82 in the order of approximately three to ten feet from oscillator 80, it is desired to introduce into the wave guide a non-dissipative, purely reactive, shunting impedance. For this purpose, as shown in Fig. 8A, a carriage 86 arranged to slide along wave guide 82 and supporting a probe 88 in the form of a short straight rod, the upper portion of which is of square cross-sectional form and the lower portion of which is threaded, as shown in more detail in Fig. 8B, is provided, and a slot 87 is cut in the wave guide along the center line of its upper side, the slot being of appropriate width to permit the insertion of the end of probe 88, the slot extending at least one-quarter wavelength each way from the median longitudinal position of the probe 88 so that its position along the wave guide 82 with respect to oscillator 80 can be varied over a distance corresponding to at least one-half wavelength by simply sliding carriage 86 on wave guide 82. A yoke 94 is affixed to carriage 86 and is provided with a square hole 96. The yoke 94 supports the upper end of rod 88, the rod having a sliding fit in hole 96 to permit vertical movement of the rod as described below.

In Fig. 8B, a cross-sectional view of the carriage 86, and a portion of a wave guide 82, taken along the center line of slot 87, is shown. The base of the carriage 86 is arranged to have a sliding fit over wave guide 82 so that it can be moved along the wave guide. The upper portion of carriage 86 comprises a yoke 94, as mentioned above, which has a square hole 96 in its upper horizontal portion, as shown, which, together with round hole 98 in the upper member of the carriage, keep the probe or partially threaded rod 88 in a substantially vertical position. Within the opening partially enclosed by yoke 94 and the upper member of the carriage 86, a knurled nut threaded to fit the threads on probe 88 is maintained in a vertically fixed, substantially median, position by washers 92, assembled on probe 88 above and below nut 90. Probe 88 is free to move vertically through washers 92 and hole 98 when knurled nut 90 is turned to effect an adjustment of the amount by which the lower end of probe 88 protrudes through slot 87 into the wave guide 82. The assembly, including carriage 86, probe 88, and knurled nut 90, just described, permits probe 88 to be protruded into wave guide 82 to any extent up to and including contact with the inner surface of the lower side of wave guide 82 and to be moved along the guide to any point of the longitudinal slot 87. The effective magnitude of the reactive impedance introduced by probe 88, as is well known to those skilled in the art, increases with the amount the lower end of probe 88 protrudes into the wave guide.

Factors entering into a determination of desirable position for the slot 87 and probe 88 and of the desirable magnitude of the reactance are discussed in connection with specific examples below. In general, the distance of slot 87 from the oscillator should be large in order to minimize the amount of reactance required to produce the desired amount of stabilization or masking. However, this distance should not exceed a value that insures substantially constant "masking" over the operating frequency range desired for the specific application. The values of these features and the application of various equations to them will be understood after consideration of the several examples discussed below.

In practice the probe or rod 88 is positioned along slot 87 to afford maximum video gain compression for any depth of insertion of rod 88 into the wave guide, when the oscillator is tuned to the mean operating frequency. This centers the compression or stabilizing point of the curve representing the effect of the reactance at the mean operating frequency. Compare curves 60 and 62 of Fig. 6. Such centering occurs at 0, 180, etc., degrees phase change in Fig. 6. The depth of insertion of the rod 88 into the wave guide slot 87 is then adjusted to produce the desired amount of masking. Compare curves 60 and 62 of Fig. 6 bearing in mind that the SWR increases with deeper insertion into the wave guide.

The frequency band width of the substantially constant stabilizing effect produced by the reactance is a function of the distance L from the oscillator to the reactance. In Fig. 6, for some purposes, this frequency band can be taken to be ±3 megacycles. In this case L was 20 feet and the periodicity P was (from Equation 12) approximately 15 megacycles. If L is decreased to 2 feet the periodicity increases to 150 megacycles and the corresponding stabilized frequency band increases to ±30 megacycles.

If the oscillator is frequency modulated, the modulator drive must be increased an amount corresponding to the compression caused by the masking, to obtain the same frequency deviation, but any frequency instability due to temperature change, power supply ripple, etc., will be reduced a corresponding amount. The effect on a frequency modulated system with varying antenna (or load) impedance is similar but more complicated, as will be discussed below.

The general method employed in accordance with the principles of the present invention can be characterized as "reactance masking" because it makes use of a reactance or non-dissipating impedance discontinuity to reduce the effect of, or to "mask," echoes resulting from impedance mismatch at the load end of the transmission line, with little loss of power relative to that which would be dissipated if similar "masking" were obtained in accordance with prior practice by inserting an attenuator.

Accordingly, "reactance masking" is obtained by deliberately introducing a non-dissipative impedance mismatch in the oscillator output in accordance with the principles described in detail above, so that the reflection or "echo" from this deliberately introduced reactive impedance renders the oscillator very substantially more resistant to injurious frequency change.

In evaluating the effect of "reactance masking," it is often convenient to compute the apparent change in the oscillator "pulling" figure resulting therefrom. It will be remembered that a reduction in "pulling" figure means less oscillator "frequency pulling," less video gain change, less distortion, etc., when a particular load impedance mismatch varies from one extreme to another.

Fig. 6 illustrates the improvement resulting from the use of the principles of the invention. Assume that the curve 60 on Fig. 6 illustrates the performance obtainable with an unmasked antenna located 20 feet from the oscillator. Also assume that masking probe 88 of Figs. 8A and 8B is located at about 2 feet from the oscillator and is adjusted to reduce the transmitter modulation sensitivity by a factor of 2.6:1, or by 8.3 decibels. Then curve 62 in Fig. 6 will indicate the system performance because reduction in "pulling" figure F is equivalent to an equal reduction in $\sigma^2-1$ (compare Equation 5) and, as will be shown later, masking by a factor of 2.6:1 is equivalent to reducing the F by 2.6:1. One decibel SWR corresponds to a $\sigma=1.12$ and .4 decibel SWR corresponds to $\sigma=1.048$, whence $$\frac{(1.112)^2-1}{(1.048)^2-1}=2.6$$

In a similar manner the improvement in frequency pulling would be similar to the change from curve 70 to curve 72 on Fig. 7, but actually slightly less because for this purpose a change in F is equivalent to a change in $$\frac{\sigma^2-1}{\sigma}$$

(compare Equation 11).

The video gain compression, reduction in "pulling" figure, and hence the stabilizing effect of any particular masking impedance mismatch can be determined by algebraic manipulation. Let $\sigma_1$ and $L_1$ refer to the VSWR and distance from the oscillator of the stabilizing reactance and $\sigma_2$ and $L_2$ be similar values for the uncontrolled impedance mismatch at the load. Furthermore, let $F_0$ represent the original "pulling" figure of the oscillator and $F_1$ represent the "pulling" figure of the combination of oscillator and $\sigma_1$.

The maximum slope of the line susceptance due to $\sigma_1$ is $$-2\pi(\sigma_1^2-1) \qquad (13)$$

and the negative oscillator susceptance slope in terms of the location of $\sigma_1$ is $$\frac{-cK10^{-6}}{1.2F_0L_1} \qquad (14)$$

The compression due to $\sigma_1$, $$=\frac{\frac{cK10^{-6}}{1.2F_0L_1}+2\pi(\sigma_1^2-1)}{\frac{cK10^{-6}}{1.2F_0L_1}}=1+\frac{F_1}{F_{j1}} \qquad (15)$$

Where $F_{j1}$ is the oscillator "pulling" figure which would just cause "frequency jumping" when $\sigma_1$ is located $L_1$ feet from the oscillator.

The oscillator susceptance, therefore, of the oscillator in combination with $\sigma_1$ located at $L_1$ (all referred to $L_2$) but expressed in terms of $F_0$ is $$\left[\frac{cK10^{-6}}{1.2F_0L_1}+2\pi(\sigma_1^2-1)\right]\frac{L_1}{L_2}=\frac{cK10^{-6}}{1.2F_0L_1}\left(1+\frac{F_0}{F_{j1}}\right) \qquad (16)$$

Expressed in terms of $F_1$, it is $$\frac{cK10^{-6}}{1.2F_1L_2} \qquad (17)$$

$$\therefore \frac{cK10^{-6}}{1.2F_0L_2}\left(1+\frac{F_0}{F_{j1}}\right)=\frac{cK10^{-6}}{1.2F_1L_2} \qquad (18)$$

and $$\frac{F_0}{F_1}=1+\frac{F_0}{F_{j1}} \qquad (19)$$

which was found to be the compression. Therefore, the effective "pulling" figure equals the original "pulling" figure reduced by the same amount that the video gain is reduced by the masking reactance.

The presence of the

"ratio $\frac{F_0}{F_{j1}}$"

in the foregoing Formula 19 indicates that a given magnitude of mismatch will produce more and more masking as it is moved further and further from the oscillator. Therefore, radio frequency power may be conserved by remote location. However, care must be taken that the masking reactance is not so remote from the oscillator that the masking echo departs seriously from phase addition during normal frequency gyrations of the transmitter, such, for example, as those due to ambient temperature or voltage supply changes. Test of 6-decibel masking, i. e., adjustment of the masking impedance so that the VSWR resulting from reflection from the masking impedance was 6 decibels, located 2.5 feet from the oscillator indicated satisfactory masking over a 25-megacycle band (less than 1 decibel loss in masking at the edges of the band).

Figure 9:
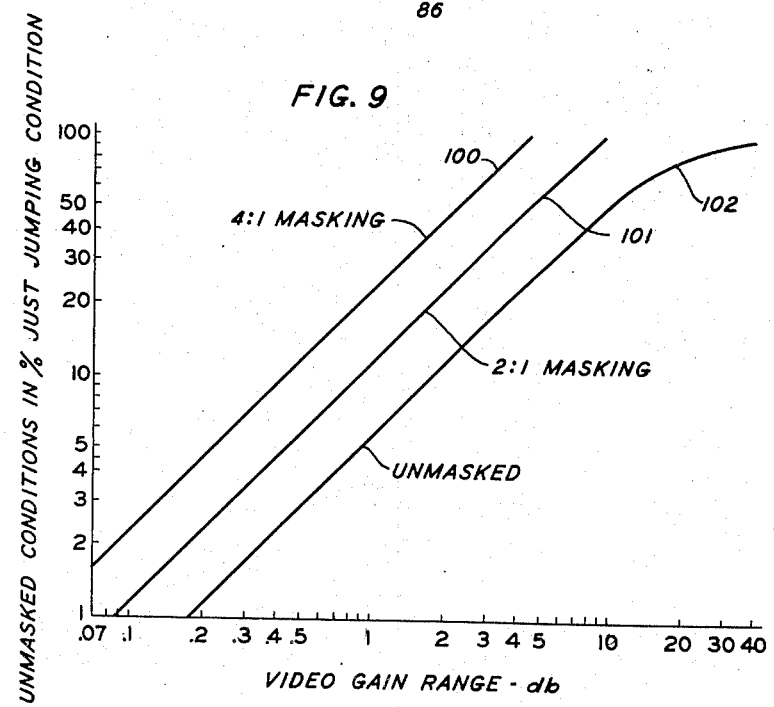
Fig. 9 is a chart showing the video gain ranges obtainable with systems embodying the principles of the invention as compared with the video gain range obtainable with a prior art system of the general type illustrated in Fig. 1.

Curves 100 to 102, inclusive, of Fig. 9 show the relation between the video gain range to be expected versus the original unmasked conditions expressed in per cent of the "just jumping" conditions defined above. Curve 102 shows the conditions for no masking, and curves 101 and 100 show the conditions for 2:1 and 4:1 "masking," respectively. 2:1 and 4:1 "masking" mean that the effective pulling figure is 50 per cent and 25 per cent, respectively, of the original, or no-masking value. It should be noted that the reduction in the number of decibels of video gain range is equal to the reduction in "pulling figure" when the original video range is less than about 5 decibels. When the original range is greater than that, the percentage improvement increases, becoming very large when the original conditions were near to or greater than those causing "frequency jumping."

An illustration of the use of the curves of Fig. 9 is as follows: Assume, for example, that in a particular system the unmasked antenna causes a video gain change of 4 decibels and that the video amplifier modulating the transmitter is such that 6-decibel video gain and over-load margins may be used in "reactance masking." What improvement is possible with reactance masking? First, find the ordinate on Fig. 9 where the 4-decibel abscissa intersects the unmasked curve, i. e., 22.5 per cent. Note the abscissa corresponding to the intersection of the 22.5 per cent ordinate with the 2:1 masking curve, i. e., 2 decibels. This indicates a 2:1 improvement. As another example, assume that the same 6-decibel masking may be applied to an antenna installation having a video gain range of 20 decibels. The range reduction in this case would be from 20 to 7.5 decibels, nearly a 3:1 improvement.

The types of systems to which the principles of this invention are applicable and the precise requirements for satisfactory operation of the numerous and varied specific systems are similarly many and varied, therefore specific rules for the application of the principles of the invention to every specific system are not feasible. However, the equations and explanatory figures discussed herein afford an adequate basis for designs to correct the undesired performance to be expected from any specific system. This is further illustrated in the following additional example:

Assume a frequency modulated transmitter having an oscillator "pulling figure" of 15 megacycles, operating through a suitable transmission line 20 feet in length, into an antenna with an SWR ($\sigma$) of 1.05. Also, assume that the maximum frequency modulation is ±5 megacycles and that oscillator temperature variations and voltage supply fluctuations, without the use of the principles of this invention, cause mean frequency drifts of ±5 megacycles.

Without the use of the principles of this invention the system performance is as follows:

"Frequency pulling" due to change in antenna impedance angle (Equation 11) is $$\pm .6 \times 15 \frac{(1.05)^2 - 1}{1.05} = \pm .8$$

megacycles. Maximum video gain expansion or compression is computed as follows:

Frequency pulling figure for "jump jumping" (Equation 5) is $$F_j = \frac{80.4}{20 \times .1} = 40.2$$

megacycles.

Maximum video expansion (Equation 8)

$$= 20 \log \frac{1}{1 - \frac{15}{40.2}} = 4 \text{ decibels}$$

Maximum video compression (Equation 7)

$$= 20 \log \left(1 + \frac{15}{40.2}\right) = 2.8 \text{ decibels}$$

In short, the changes in antenna impedance and in oscillator supply voltages and temperature could normally be expected to cause the transmitter mean frequency to vary ±.5±.8=±1.3 megacycles and the system video gain to vary +4 to −2.8 decibels=6.8 decibels.

If the principles of the present invention are applied, as described in detail above, in such a manner that the transmitter oscillator modulation sensitivity is reduced 12 decibels, the effective oscillator pulling figure is then reduced to ¼ the original value, i. e., to $$\frac{15}{4} = 3.75$$

megacycles. Using Equations 11, 8 and 7 again, as described above, the effect is seen to be that the mean frequency variation is reduced from ±1.3 megacycles to ±.325 megacycles and the video gain variation from 6.8 decibels to 1.6 decibels. Of course, the 12-decibel reduction in transmitter modulation sensitivity requires a corresponding 12-decibel increase in transmitter video input power.

The location of the "masking" reactance requires consideration as outlined below although considerable latitude is permissible. The magnitude of reactance required to produce 12-decibel masking decreases as the distance from the oscillator is increased but the frequency range over which substantially 12-decibel masking is obtained decreases as the distance increases. In the example under consideration the necessary frequency band width can be determined as follows:

Mean frequency variation ±.325 megacycles plus maximum frequency modulation ±5 megacycles=±5.3 megacycles, approximately. Accordingly, the 12-decibel masking should be substantially constant over a 10.6-megacycle band centered at the desired operating frequency.

If the "masking" reactance is located 10 feet along the transmission line from the oscillator, the period of its effect is (Equation 12)

$$P = \frac{303}{10} = 30$$

megacycles, approximately. Compression, as indicated by curve 60 of Fig. 6, can vary as much as a decibel or two across a 10.6-megacycle frequency band.

If the reactance is located only 5 feet along the transmission line from the oscillator the period is approximately 60 megacycles and the variation across the 10.6-megacycle frequency band is then only a few tenths of a decibel.

Numerous and varied alternative forms of circuit arrangements embodying the principles of the invention will readily occur to those familiar with the radar and microwave arts upon consideration of the above-described examples and of the specific embodiments illustrated by Figs. 8A and 8B described above and Figs. 10 and 11, described below.

By way of still further example, receivers for frequency modulated signals often introduce undesirable noise into the transmitted signal because the so-called "local" or beating oscillator used in reducing the frequency of the incoming signal to that of the intermediate frequency amplifier, fluctuates in frequency. Other common and more serious causes of frequency fluctuation can be vibration of the vacuum tube elements, ripples on the power supply voltages, etc. Relatively low frequency fluctuations can usually be prevented by conventional automatic frequency control circuits but those occurring at frequencies within the system modulating frequency band, cannot be removed in that manner. The principles of this invention may, however, be used to greatly reduce the latter type of frequency variations in a simple manner, as will be described below.

Figs. 10 and 11 illustrate specific methods of applying the principles of the invention to the problem just discussed above.

In more detail, in Fig. 10, a "local" beating oscillator 200 is connected by wave guide 202 to the demodulator stage 206 of a microwave receiver. Assuming by way of example that the median frequency of the incoming radio frequency signal is 4,000 megacycles and that a mean intermediate frequency of 70 megacycles is desired for use in the intermediate frequency amplifier of the receiver, oscillator 200 should provide a frequency of 4,000±70 megacycles, i. e., either 4,070 or 3,930 megacycles. The received radio frequency signal (input 205) and the beating oscillator frequency (via wave guide 202) are introduced into demodulator 206 and combine to produce the desired intermediate frequency (output 207) in a manner well known to those skilled in the art. See, for example, the article entitled "Microwave repeater research," by H. T. Friis, published in the Bell System Technical Journal, volume XXVII, No. 2, April 1948, particularly page 220 thereof. See, also, the article entitled "Microwave converters," by C. F. Edwards, published in the Proceedings of the I. R. E., volume 35, No. 11, for November 1947.

In order to stabilize the frequency of the oscillator 200 to eliminate fluctuations which can arise from causes such as those described above, a second wave guide 208 is coupled through directional coupler 204 to wave guide 202 at a point near the oscillator 200. Reference may be had to an article entitled "Techniques and facilities for microwave radar testing," published in the Bell System Technical Journal, volume 25, No. 3, for July 1946, particularly at pages 468 to 473, inclusive, or to an article entitled "Directional couplers" by W. W. Mumford, published in the Proceedings of the I. R. E., volume 35, No. 2, for February 1947, at page 160, for descriptions of "directional couplers." Alternatively, the wave guides 202 and 208 can be coupled by a simple wave guide T of the type described by W. A. Tyrrell in an article entitled "Hybrid circuits for microwaves," published in the Proceedings of the I. R. E., volume 35, No. 11, for November 1947, at pages 1294 to 1306.

At the lower end of wave guide 208, a variable attenuator 210 and a short additional section of wave guide 212 are shown, the attenuator interconnecting the additional section 212 with the wave guide 208, as shown. In the lower end of section 212, a short circuiting plunger 214, the position of which along the section is adjustable, is provided. Section 212 can preferably be of the same type of wave guide as wave guide 208. Adjustment of the position of plunger 214, obviously, adjusts the phase of the reflection and permits adjustment to the condition for maximum compression, i. e., with the reflected wave in phase with the oscillator output. The attenuator 210 affords convenient means for controlling the amplitude of the stabilizing reflected energy.

Attenuator 210 can be, for example, of the type described in detail in the copending application of A. E. Bowen (Case 19), Serial No. 486,013, filed May 7, 1943, now Pat. No. 2,600,466, issued June 6, 1952, and assigned to applicant's assignee. It should be noted that in the arrangement of Fig. 10, the energy delivered to the load, i. e., modulator 206, does not pass through the attenuator 210. It should further be noted that in the arrangement of Fig. 10 the effective length of the wave guide 208, from the end of which the stabilizing "echo" or reflected energy is received, can be made any desired value either greater or smaller than the length of wave guide 202. In general, it will be found desirable to make it greater.

As a typical example, wave guide 202 can be 1 foot long and wave guide 208 can be 4 feet long. Since we are, in the case of the system of Fig. 10, stabilizing a source having a very narrow operating frequency band (substantially a single frequency), it is desirable, in accordance with the principles of the invention as discussed in detail above, to place the stabilizing reactance at a relatively large distance from the stabilized oscillator. As stated previously this permits the use of a relatively small reactance (device 212). The arrangement of Fig. 10 is, obviously, particularly well adapted to systems in which it is desirable to place the stabilizing reactance at an effective electrical distance greater than that of the load (modulator 206) from the oscillator to be stabilized.

A minor variation of the system of Fig. 10 is illustrated in Fig. 11. In Fig. 11, the variable length section of wave guide 212 of Fig. 10 is replaced by a fixed length of wave guide 218, short-circuited at its lower end 220. A variable phase shifter 216 is then inserted between wave guide section 218 and attenuator 210 and can be adjusted to bring the echo from section 218 into the desired phase relation at the output of oscillator 200. The variable phase shifter can, for example, be of the type described in detail in the copending application of D. H. Ring (Case 11), Serial No. 640,495, filed January 11, 1946, now abandoned and assigned to applicant's assignee. Attenuator 210, with the arrangement of Fig. 11 then, of course, connects to the lower end of wave guide 208 as for the system of Fig. 10.

Numerous other similar variations of the embodiments of the invention shown in detail above, can readily be made by those skilled in the art. For example, in the system of Figs. 8A and 8B, probe 88 could be placed in a fixed position at approximately the desired distance from oscillator 80 and a phase shifter similar to 216 of Fig. 11 could then be inserted in the wave guide 82 between the position of the probe and the oscillator 80. Adjustment of the phase shifter could then be made to bring the echo from probe 88 into the desired phase relation at the oscillator 80. A further alternative arrangement is that of inserting a variable phase shifter in wave guide 30 of Fig. 1 and continuously adjusting it either manually, or by any of the numerous automatic compensating circuits known to the art, to maintain a substantially constant desired phase relation between the echo from antenna 34 and the oscillator 11.

No attempt has been made to exhaustively illustrate the large number of equivalent arrangements, embodying the principles of the invention, which can, obviously, be devised by those skilled in the art. The above-described specific embodiments illustrate the application of the principles involved.

What is claimed is:

1. A combination for use in a microwave radio transmission system, a demodulator, a beating oscillator, a first wave guide a plurality of wavelengths long of the frequency of said beating oscillator, said wave guide interconnecting said oscillator and said demodulator, a second wave guide and a directional coupler, said directional coupler interconnecting said first wave guide and one end of said second wave guide at a point near the end of said first wave guide which connects to said oscillator, a third wave guide including a short-circuiting means, and a variable attenuator, said variable attenuator interconnecting the end of said second wave guide remote from said directional coupler, with said third wave guide.

2. The combination of claim 1 and a variable phase shifter interconnecting said third wave guide with said variable attenuator.

3. A high frequency transmission system comprising a high frequency oscillator, a high frequency antenna the impedance of which is subject to substantial variations depending upon temperature, humidity, icing conditions, and similar variable and uncontrollable factors, a wave guide transmission line having a length of a substantial number of wave lengths of the frequency to be transmitted, said wave guide interconnecting said oscillator and said antenna, means for reducing the reactive effects of said impedance variations upon said oscillator comprising a substantionally lossless reactive impedance connected to said wave guide at a point along said wave guide substantially closer to said oscillator than to said antenna and presenting a substantially reactive impedance to said oscillator, and means for varying the distance along said wave guide between said oscillator and said reactive impedance.

4. A system according to claim 3 in which said distance between the oscillator and the reactive impedance is that at which energy reflected back to the oscillator from the reactive impedance arrives at the oscillator substantially in phase with the oscillator output energy.

5. A system according to claim 3 in which said distance between the oscillator and the reactive impedance is such as to produce reflection waves at the oscillator in phase with the oscillator output waves.

EDMUND R. TAYLOR.

References Cited in the file of this patent

UNITED STATES PATENTS

| Number | Name | Date |
|---|---|---|
| 2,188,389 | Cork et al. | Jan. 30, 1940 |
| 2,419,613 | Webber | Apr. 29, 1947 |
| 2,422,190 | Fiske | June 17, 1947 |
| 2,437,889 | Nordsieck | Mar. 16, 1948 |
| 2,491,669 | Larson | Dec. 20, 1949 |
| 2,499,182 | Dyson | Feb. 28, 1950 |
| 2,531,437 | Johnson et al. | Nov. 28, 1950 |